United States Patent
Tanaka et al.

(10) Patent No.: US 6,910,789 B2
(45) Date of Patent: Jun. 28, 2005

(54) REFLECTOR-MOVABLE HEADLAMP

(75) Inventors: Hideki Tanaka, Shimizu (JP); Masayoshi Kuroda, Shimizu (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 159 days.

(21) Appl. No.: 10/364,195

(22) Filed: Feb. 11, 2003

(65) Prior Publication Data

US 2003/0169597 A1 Sep. 11, 2003

(30) Foreign Application Priority Data

Mar. 6, 2002 (JP) ........................................ 2002-060372

(51) Int. Cl.[7] .............................................. B60Q 1/068
(52) U.S. Cl. ....................... 362/514; 362/524; 362/529; 362/531; 362/532
(58) Field of Search ................................ 362/529, 530, 362/421, 428, 287, 514, 531, 532, 289

(56) References Cited

U.S. PATENT DOCUMENTS

| | | | | |
|---|---|---|---|---|
| 4,843,523 A | * | 6/1989 | Nakamura ................... | 362/515 |
| 5,260,857 A | * | 11/1993 | Lukkarinen et al. ......... | 362/528 |
| 5,573,326 A | * | 11/1996 | Iijima ........................... | 362/460 |
| 5,647,659 A | | 7/1997 | Mori | |
| 5,697,692 A | * | 12/1997 | Hoffman et al. ............. | 362/460 |
| 6,036,341 A | * | 3/2000 | Dobler et al. ................ | 362/524 |
| 6,082,882 A | * | 7/2000 | Akiyama et al. ............ | 362/524 |
| 6,481,879 B1 | * | 11/2002 | Shirai et al. ................. | 362/514 |
| 6,543,916 B2 | * | 4/2003 | Shirai .......................... | 362/460 |
| 6,733,162 B2 | * | 5/2004 | Kurita et al. ................ | 362/524 |

FOREIGN PATENT DOCUMENTS

GB          2 339 715          2/2001

* cited by examiner

Primary Examiner—Thomas M. Sember
(74) Attorney, Agent, or Firm—Koda & Androlia

(57) ABSTRACT

A vehicle headlamp including a reflector installed so as to be tiltable by an aiming mechanism installed in the lamp body. The aiming screw of the aiming mechanism has a rearward-extending portion that extends out of the lamp body, and a crown gear is attached to an area near the end of the rearward-extending portion so as to be spaced apart from a screw supporting wall of the lamp body that supports the middle portion of the aiming screw. An expanded-out wall that functions as a screwdriver guide for supporting a screwdriver that is used to rotate the crown gear is provided above the screw supporting wall. The end of the rearward-extending portion of the aiming screw is supported by a bracket that is installed near the screw supporting wall.

4 Claims, 8 Drawing Sheets

REFLECTOR-MOVABLE HEADLAMP

BACKGROUND OF THE INVENTION

1. Field of the Invention

The present invention relates to a vehicle headlamp and more particularly to a reflector-movable headlamp in which a reflector that has a light source is mounted is supported by an aiming mechanism so as to be tiltably moved with respect to a lamp body.

2. Prior Art

In a typical reflector-movable headlamp, a crown gear is provided at a rearward-extending portion of an aiming screw which is an aiming mechanism component and extends through a rear wall of the lamp body. With a screwdriver, the crown gear is rotated, thus rotatably operating the aiming screw.

One example of a headlamp of this type is disclosed in U.S. Pat. No. 5,647,659.

In this headlamp, as seen from FIG. 8, a reflector 2 housed in a lamp body 1 is supported by an aiming screw 3, which is the aiming mechanism component. The aiming screw 3 is rotatably supported by the rear wall of the lamp body 1, and a rotational operation bar 4 that extends upward along the rear wall is provided. An orthogonal conversion gear mechanism 5 composed of a plurality of gears is provided between the rotational operation bar 4 and a rear end portion of the screw 3 that protrudes rearward from the rear wall of the lamp body 1. The lamp body 1 includes an expanded-out wall 1a provided above the orthogonal conversion gear mechanism 5. The end face 1a1 of the expanded-out wall 1a is positioned on an extended line of the rotational operation bar 4; and as shown by the imaginary lines, the end face 1a1 contacts and supports the side-surface of a screwdriver 7 that is connected to the rotational operation bar 4. In FIG. 8, the reference numeral 1b is a pair of right and left vertical walls provided on the end face 1a1 of the expanded-out wall 1a. The vertical walls support, as a guide that has a U-shaped cross section, the side-surface of the screwdriver 7.

When the rotational operation bar 4 is rotated by the screwdriver 7, the rotational operation bar 4 rotates the aiming screw 3. Since the front end of the aiming screw 3 is screwed to a nut 2a that is fitted in the rear surface of the reflector 2, with the rotation of the aiming screw 3, the nut 2a is moved back and forth by the aiming screw 3; as a result, the reflector 2 is tiltably moved and faces upward and downward.

However, in the above conventional structure, the rotational operation bar 4 and the orthogonal conversion gear mechanism 5 are provided in the aiming mechanism. As a result, the aiming mechanism tends to have a complicated structure and a heavy weight.

As a result, as seen from FIG. 9, the inventors came up with an idea to provide a crown gear 8 on a rearward-extending portion of the aiming screw 3, so that the crown gear 8 is directly rotated by the screwdriver 7. In this structure, the rotational operation bar 4 and the orthogonal conversion gear mechanism 5 are unnecessary, and thus the aiming mechanism is simple in structure and light in weight.

However, when rotating the crown gear 8 by the screwdriver 7, a pressing force P that is applied by the screwdriver 7 causes the aiming screw 3 to swing with respect to the screw insertion hole 1c, and this inhibits a smooth aiming operation. Moreover, when the aiming operation that accompanies the swing of the aiming screw 3 is repeated, looseness occurs between the aiming screw 3 and the screw insertion hole 1c. This would cause an oscillation of the bean position.

After further considerations, the inventors mounted a bracket (not shown) on the rear wall of a lamp body so that the bracket supports the rearward-extending portion of the aiming screw 3. With this structure, the aiming screw 3 does not swing when the crown gear 8 is rotated by the screwdriver 7, and no looseness is generated between the aiming screw 3 and the screw insertion hole 1c.

SUMMARY OF THE INVENTION

Accordingly, the present invention is to eliminate the problems incurred with the conventional vehicle lamps, and it is based upon the findings made by the inventors.

The object of the present invention is to provide a reflector-movable headlamp which is provided with an aiming mechanism that is simple in structure, light in weight and easy to operate.

The above object is accomplished by a unique structure of the present invention for a reflector-movable headlamp in which a reflector that has a light source is supported by an aiming mechanism so as to be tiltably moved with respect to a lamp body; and in the present invention, the aiming screw of the aiming mechanism is provided so that a rearward-extending portion of the aiming screw extends out of a screw supporting wall of the lamp body, a crown gear is provided on the rearward-extending portion of the aiming screw so as to be spacedly apart from the screw supporting wall, the crown gear being to be meshed with the tip end of a screwdriver that is operated in a direction substantially perpendicular to the aiming screw, an expanded-out wall is formed at a position adjacent to the screw supporting wall of the lamp body so that the expanded-out wall serves as a screwdriver insertion guide and a screwdriver side-surface supporting guide, and the rearward-extending portion of the aiming screw is supported by a bracket which is provided near the screw supporting wall of the lamp body.

In this structure, the expanded-out wall is provided adjacent to the screw supporting wall of the lamp body, and thus it decreases the chances that various things hit the crown gear and the rearward-extending portion of the aiming screw that protrudes out of the screw supporting wall.

In addition, the rotational operation bar and an orthogonal conversion gear mechanism that are necessary in conventional aiming mechanisms are not required in the present invention. Accordingly, the aiming mechanism can be simple in structure and light in weight.

In the above structure of the present invention, the pressing force that acts on the aiming screw by the screwdriver at the time of rotating the crown gear is carried by the bracket that supports the rearward-extending portion of the aiming portion, and it does not act further on the support portion of the aiming screw (that is, the screw insertion hole of the lamp body). In other words, when the crown gear is rotated by the screwdriver, a force that is large enough to swing the aiming screw with respect to the screw insertion hole does not act on the aiming screw.

Furthermore, in the present invention, the bracket is substantially L-shaped and has a sidewise extending section and a bent extending section, the sidewise extending section extending along the side of the rearward-extending portion of the aiming screw, and the bent extending section being bent from the tip end of the sidewise extending section; wherein the sidewise extending section is formed with a screwdriver insertion hole which is opened in a direction in which a screwdriver guide portion of the expanded-out wall extends, and which, in cooperation with the screwdriver guide portion, maintains the screwdriver to be linked with the crown gear; and the bent extending section supports the rear end of the rearward-extending portion of the aiming screw.

Since the crown gear is covered by the bent extending section of the bracket, it is less likely that various things hit the crown gear and the rearward-extending portion of the aiming screw that protrudes rearward and out of the screw supporting wall.

Moreover, the side-surface of the screwdriver is supported by the screwdriver guide portion of the expanded-out wall, and the tip end portion of the screwdriver is positioned in the screwdriver insertion hole provided in the sidewise extending section of the bracket. Accordingly, the screwdriver is, when rotated, maintained to be linked with the crown gear (in other words, the teeth of the screwdriver are kept meshed with the crown gear).

Moreover, the pressing force applied by the screwdriver that acts on the rearward-extending portion of the aiming screw via the crown gear is supported at two points by (the screw insertion hole of) the screw supporting wall and by the bracket. Accordingly, the screwdriver will not affect very much the support portion for the aiming screw (i.e. the screw insertion hole of the lamp body).

Further, the bracket is set on the lamp body with its bent extending section being engaged with the rear end of the rearward-extending portion of the aiming screw. With this manner of setting, the bracket can take a form in which it supports the rear end of the rearward-extending portion of the aiming screw.

In the above, by way of providing the bracket between the rearward-extending portion of the aiming screw and the expanded-out wall of the lamp body, the rearward-extending portion of the aiming screw that has thereon the crown gear, the bracket, and the expanded-out wall are all arranged in a compact manner on a straight line, and they do not easily interface with other components of the lamp.

Furthermore, in the present invention, an actuator for automatic leveling can be installed on the lamp body in place of the bracket. So as to allow the actuator for automatic leveling to be installed, the (aiming) screw supporting wall of the lamp body is structured so that the rearward protrusion amount of the expanded-out wall that protrudes from the screw supporting wall is set to be equal to the rearward protrusion amount of the actuator for automatic leveling.

By way of installing the actuator for automatic leveling on the screw supporting wall instead of the bracket, the reflector is tiltably adjusted in the vertical direction automatically in accordance with the inclination of the vehicle with respect to the driving road surface; and thus, the lamp becomes one in accordance with automatic leveling specifications. In addition, by way of using the expanded-out wall as a screwdriver guide, the teeth of the screwdriver can be easily brought to mesh with the crown gear that is provided at the rear end of the actuator, and the screwdriver is thus smoothly operated in this state and rotates the crown gear.

DETAILED DESCRIPTION OF THE INVENTION

Hereafter, the embodiments of the reflector-movable headlamp according to the present invention will be described below with reference to the accompanying drawings.

Figure 1:
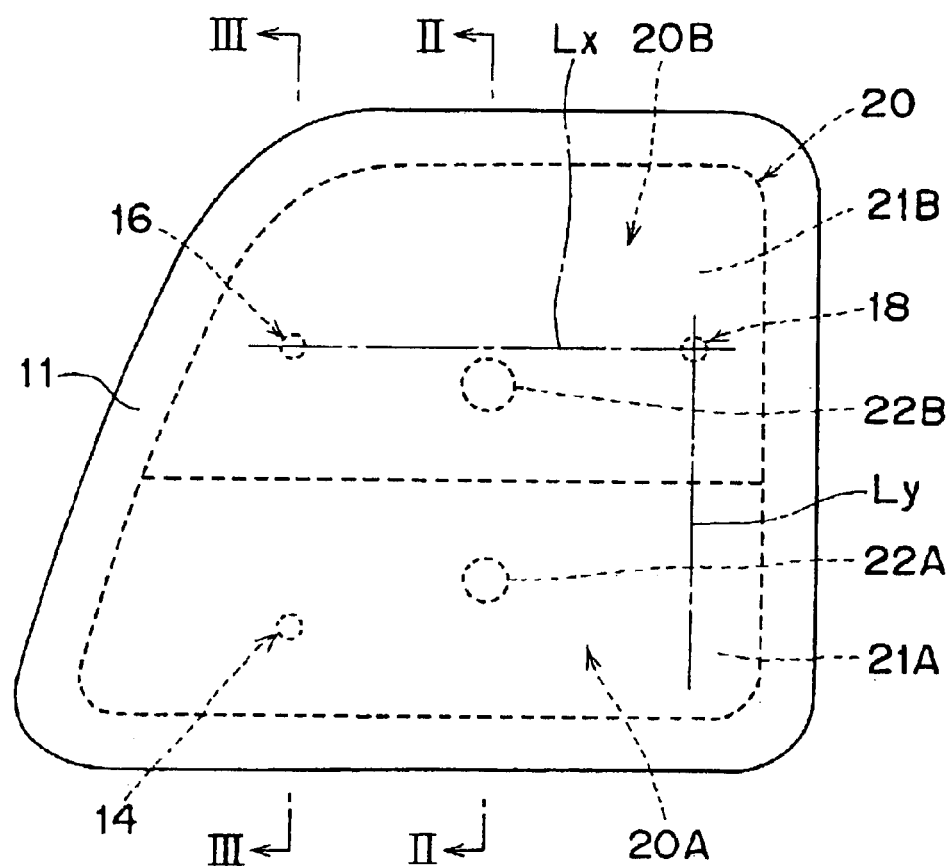
FIG. 1 is a top view of the reflector-movable headlamp according to one embodiment of the present invention.
Figure 2:
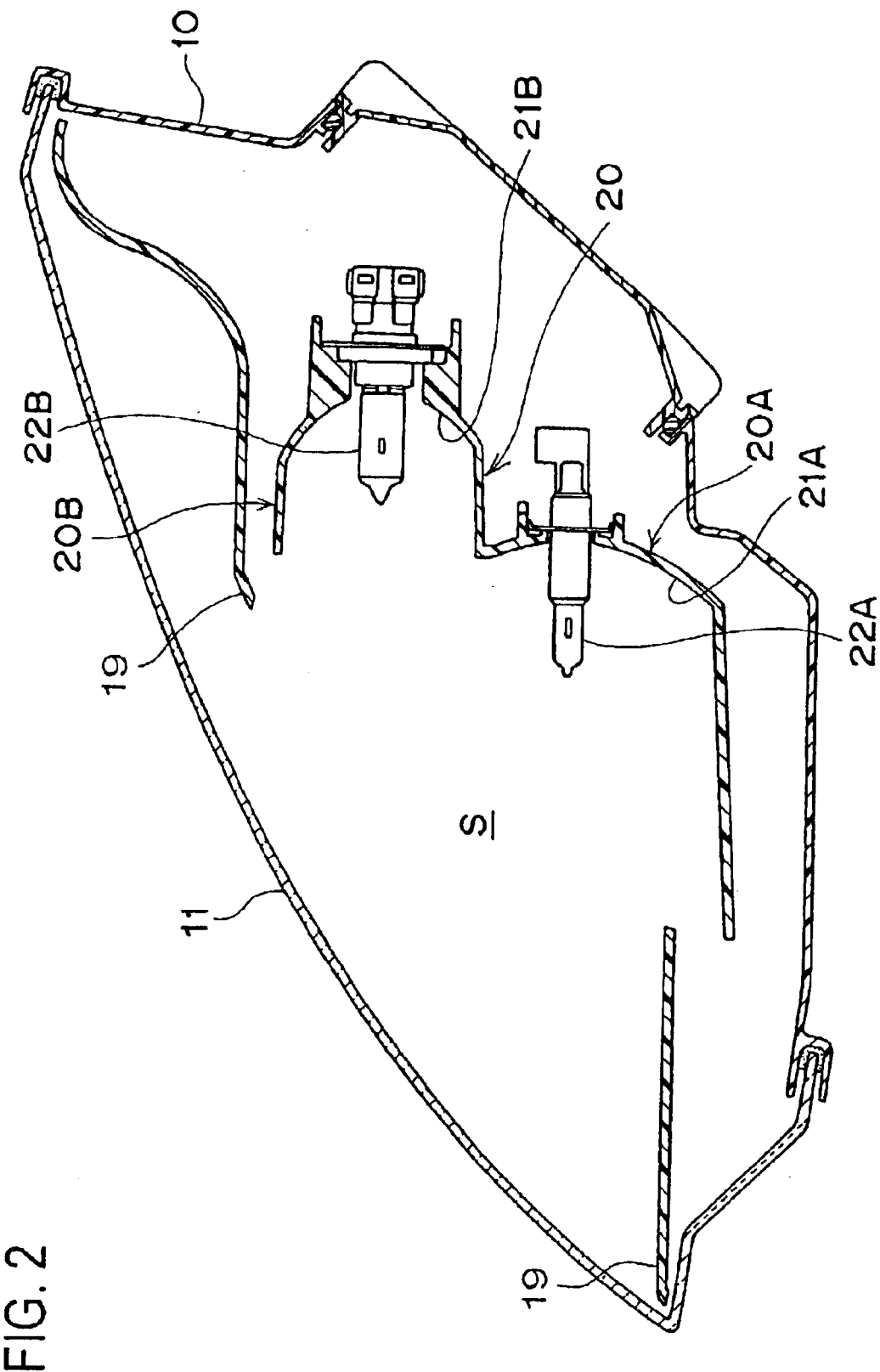
FIG. 2 is a vertical cross sectional view thereof (i.e. a vertical sectional view taken along the line II—II in FIG. 1.)
Figure 3:
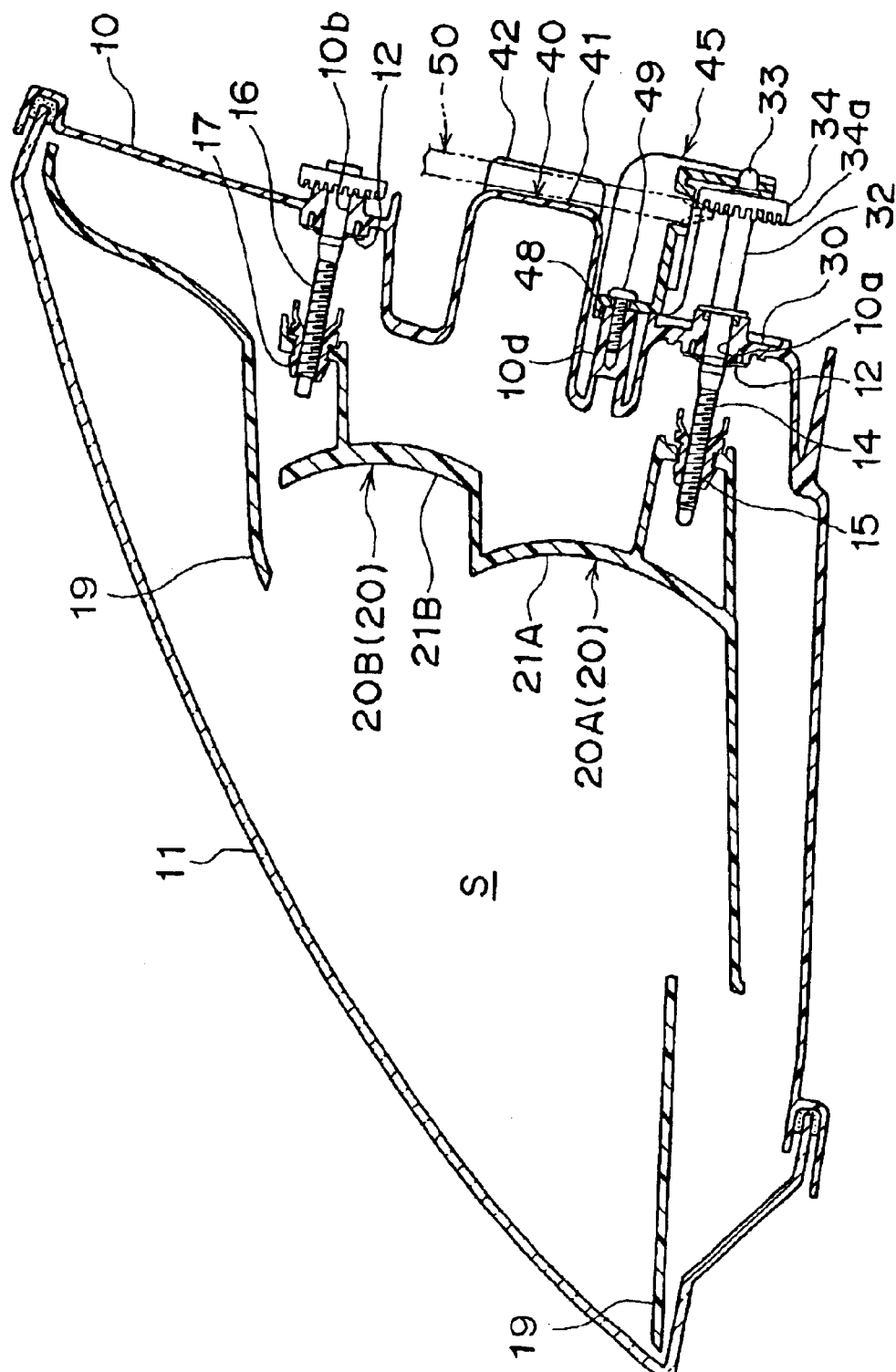
FIG. 3 is a vertical cross sectional view thereof (i.e. a vertical sectional view taken along line III—III in FIG. 1.)

The headlamp is of the present invention is mounted on an automobile such as a sport car, for instance, in which the front end of the vehicle is formed in a streamline shape. As shown in FIGS. 1 to 3, a lamp body 10 and a front cover 11 that define a lamp chamber S are formed into a shape which is greatly inclined in three dimensional.

The lamp body 10 is a container-like shape, and its front side is opened from the front to the side of a vehicle. A reflector 20 is provided inside the lamp body 10 so as to be tiltably moved by two aiming screws 14 and 16 and a ball joint 18 which form the aiming mechanism.

The aiming screws 14 and 16 are provided so as to pierce the rear wall of the lamp body 10 at a lower portion and an upper portion of the rear wall, respectively, which are closer to the inner side of the width direction of a vehicle when the lamp is viewed from the front. The aiming screws 14 and 16 are rotatably supported respectively in screw insertion holes 10a and 10b that are the pierced portions. Front ends of the aiming screws 14 and 16 are screwed into nuts 15 and 17 that are fitted in the back of the reflector 20.

The reference numerals 12 in FIG. 3 are push-on fixes. The push-on fix 12 holds the aiming screw 14 (16) in the screw insertion hole 10a (10b) formed in the rear wall of the lamp body 10 so that the aiming screw 14 (16) does not come off of the lamp body.

The ball joint 18 has a structure in which a ball portion (not shown) that protrudes from the back of the reflector 20 is supported by a ball bearing portion (not shown) provided on the rear wall. The ball joint 18 is provided at the same (height) level as the aiming screw 16 (see FIG. 1).

When the aiming screw 14 is rotated, the nut 15 is moved forward and backward along the aiming screw 14, and the reflector 20 is tiltably moved around a horizontal axis Lx that passes through the ball joint 18 and the bracket 17. When the aiming screw 14 and the aiming screw 16 are rotated in the same direction, the nuts 15 and 17 are moved forward and backward along the aiming screws 14 and 16, and the reflector 20 is tiltably moved around the imaginary vertical axis Ly that passes through the ball joint 18.

The reflector 20 supported by the aiming mechanism is integrally provided with a reflective lamp unit 20A that forms a high-beam and a reflective lamp unit 20B that forms a low-beam. More specifically, in the lower half of the reflector 20 is provided the reflective lamp unit 20A that forms the high-beam constituted by an effective multiple reflective surface 21A and a bulb 22A which serves as a light source. Right above the lamp unit 20A is provided the reflective lamp unit 20B that forms the low-beam constituted by an effective multiple reflective surface 21B and a bulb 22B which serves as a light source. The reference numeral 19 is an extension reflector that conceals a gap between the reflector 20 and the lamp body 10.

The aiming screw 14 supported in the screw insertion hole 10a of the lamp body 10 extends out of a screw supporting wall 30. The tip portion of the rearward-extending portion 32 of the aiming screw 14 is provided with a crown gear 34 in an integral fashion. The aiming screw 14 is rotated by a screwdriver (or an aiming operation tool) 50. Moreover, at a position above the screw supporting wall 30 of the lamp body 10, an expanded-out wall 40 is formed so as to cover the rearward-extending portion 32 of the aiming screw 14 in a canopy-like manner. The expanded-out wall 40 expands rearward along the rearward-extending portion 32 of the aiming screw 14.

The rear end surface 41 of the expanded-out wall 40 is provided so as to act as a screwdriver insertion guide that guides the addenda 51 of the tip end of the screwdriver 50 to gear teeth 34a of the crown gear 34. More specifically, the aiming adjustment is performed by way of inserting the screwdriver 50 along the rear wall of the lamp body 10 from above the headlamp. So as to make the aiming adjustment is operated smoothly, the rear end surface 41 of the expanded-out wall 40 is formed by a plane which is substantially perpendicular to the aiming screw 14 and agrees with a position at which the teeth 34a of the crown gear 34 are disposed; and thus, when the shank of the screwdriver 50 is inserted along the rear end surface 41 of the expanded-out wall 40, the addenda 51 at the tip end of the shank of the screwdriver 50 is brought into a state where they are meshed with the teeth 34a of the crown gear 34 (i.e. the screwdriver 50 and the crown gear 34 are linked with each other).

Moreover, a pair of (or right and left) vertical walls 42 are formed so as to protrude from the rear end surface 41 of the expanded-out wall 40 that acts as the screwdriver insertion guide. The vertical walls 42 extend in parallel with each other in the vertical direction, thus forming a screwdriver side-surface guide that has a U-shaped horizontal cross section. The vertical walls 42 that form the screwdriver side-surface guide restrict a lateral positioning of the screwdriver 50 when the screwdriver 50 is inserted; as a result, the screwdriver 50 can be meshed with the teeth 34a of the crown gear 34 quickly and reliably.

Figure 5:
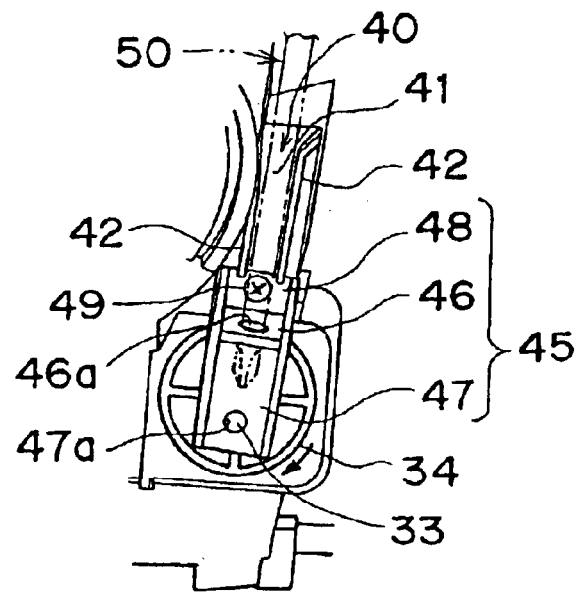
FIG. 5 is a rear view of the vicinity of the rearward-extending portion of the aiming screw in the headlamp.

Furthermore, the screwdriver guide (formed by the rear end surface 41 of the expanded-out wall 40 and the vertical walls 42) surround the right and left surfaces and the front surface of the screwdriver 50 when the screwdriver 50 is rotated, thus guiding the screwdriver 50 so as not to wobble at the time of rotation. Accordingly, the addenda 51 of the screwdriver 50 is prevented from disengaging from the teeth 34a of the crown gear 34, and a smooth rotation of the crown gear 34 (the aiming screw 14) is ensured. Moreover, as seen from FIG. 5, the vertical walls 42 that constitute the screwdriver side-surface guide having a U-shaped horizontal cross section are formed so that the upper portions thereof from which the screwdriver is inserted are tapered. As a result, the screwdriver 50 can be easily brought into the screwdriver side-surface guide.

Figure 4:
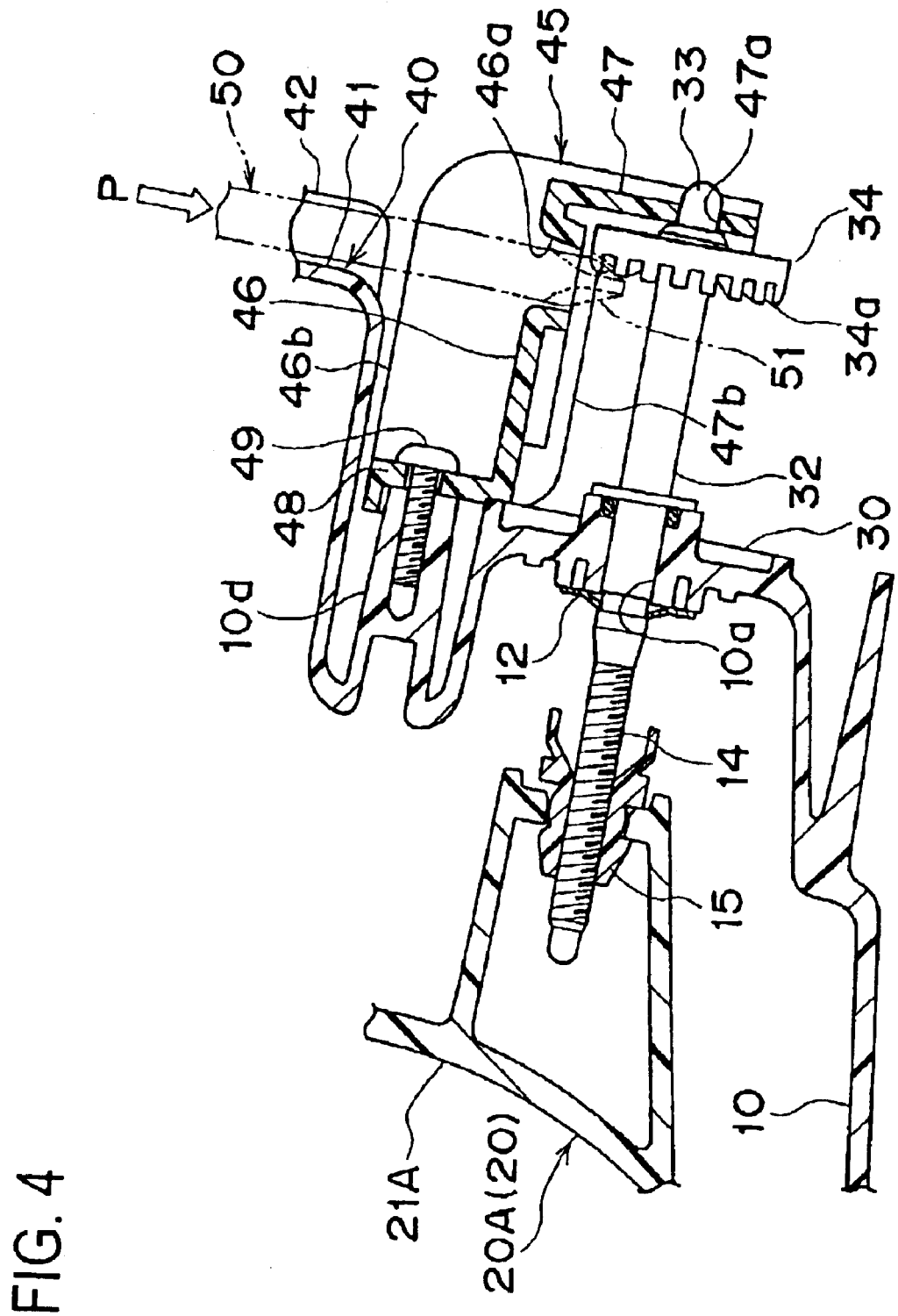
FIG. 4 is an enlarged vertical sectional view of the vicinity of the rearward-extending portion of the aiming screw that extends out of the screw supporting wall.
Figure 6A:
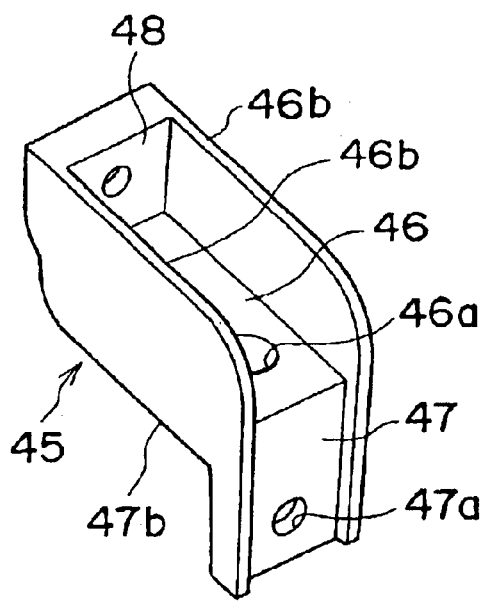
FIG. 6A is a front perspective view of the bracket.
Figure 6B:
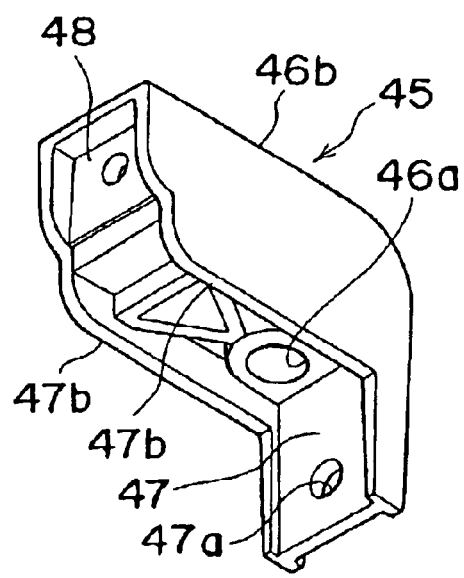
FIG. 6B is a rear perspective view thereof.

A bracket 45 is disposed between the rearward-extending portion 32 of the aiming screw 14 and the expanded-out wall 40, and a rear end 33 of the rearward-extending portion 32 of the aiming screw 14 is supported by the bracket 45. As shown in FIGS. 4, 6A and 6B, the bracket 45 has a sidewise extending section 46, which extends in parallel with the rearward-extending portion 32 of the aiming screw 14, and a bent extending section 47, which is bent at right angles from the tip end of the sidewise extending section 46 and extends downward. The bracket 45 is thus formed in an L-shape so that it extends substantially at right angles from the portion above the rearward-extending portion 32 of the aiming screw 14 to the rear surface of the crown gear 34.

The sidewise extending section 46 is provided with a screwdriver insertion hole 46a which extends in a vertical direction that is perpendicular to the rearward-extending portion 32 of the aiming screw 14, that is, the direction in which the screwdriver guide of the expanded-out wall 40 extends. As seen from FIG. 4, the screwdriver insertion hole 46a is formed in a tapered shape with a diameter thereof decreasing in the (downward) direction toward the teeth 34a of the crown gear 34. Accordingly, when the screwdriver 50 is inserted along the screwdriver side guides 42 of the expanded-out wall 40 into the screwdriver insertion hole 46a, the teeth 51 of the screwdriver 50 mesh with the teeth 34a of the crown gear 34 smoothly, and the tip end portion of the screwdriver 50 is engaged with the screwdriver insertion hole 46a easily and positioned therein assuredly. Thus, the teeth 51 of the screwdriver 51 meshed with the teeth 34a of the crown gear 34 (i.e. a situation in which the screwdriver 50 is linked with the crown gear 34) is maintained.

Accordingly, when the screwdriver 50 is rotated while the tip end portion of the screwdriver 50 is engaged with the screwdriver insertion hole 46a and the side-surface of the screwdriver 50 is in contact with the screwdriver guide, the screwdriver 50 is rotated while maintaining a liaison form with the crown gear 34, and a smooth rotational operation of the aiming screw 14 (for a vertical aiming) is accomplished.

Further, an engagement hole 47a that supports the rear end 33 of the rearward-extending portion 32 of the aiming screw 14 is provided in the bent extending section 47 that is formed so as to cover the crown gear 34. More specifically, when the crown gear 34 is rotated by the screwdriver 50, a pressing force P (see FIG. 4) by the screwdriver 50 acts on the aiming screw 14 via the crown gear 34. At this point, the rear end 33 of the rearward-extending portion 32 of the aiming screw 14 is carried and supported by the bracket 45 provided on the lamp body 10. Accordingly, the rearward-extending portion 32 of the aiming screw 14 is in a position supported at both ends thereof with respect to the pressing force P which is a load. Thus, the pressing force P does not act further on the support portion (i.e. the screw insertion hole 10a of the lamp body) of the aiming screw 14. In other words, a force that is large enough to swing the aiming screw 14 with respect to the screw insertion hole 10a does not act on the aiming screw 14 when the crown gear 34 is rotated by the screwdriver 50. Therefore, in the above embodiment, the aiming operation that tiltably adjusts the reflector 20 in the vertical direction with the use of the screwdriver 50 is smoothly performed.

Moreover, the rearward-extending portion 32 of the aiming screw 14 and the crown gear 34 are covered by the bracket 45, and the expanded-out wall 40 is provided above the bracket 45. Accordingly, the rearward-extending portion 32 of the aiming screw 14 and the crown gear 34 are prevented from being damaged. More specifically, when, for instance, a headlamp is installed in a vehicle, the rearward-extending portion 32 and the gear 34 might hit the vehicle body and damage the vehicle body. However, the rearward-extending portion 32 of the aiming screw 14 in the shown embodiment is covered not only by the expanded-out wall 40 that protrudes in a canopy-like manner but also by the bracket 45. Accordingly, even if the expanded-out wall 40 and the bracket 45 hit the vehicle body, the rearward extending 32 of the aiming screw 14 or the crown gear 34 would not directly hit the vehicle body, and thus the aiming screw 14 is not damaged.

The reference numerals 46b and 47b are reinforcement ribs formed along the both side edge portions in the width direction of the bracket 45, and they enhance the synthetic strength of the bracket 45.

Further, a right angle bent base portion 48 for mounting the bracket 45 to the lamp body 10 is provided on the front end side of the bracket 45. After the engagement hole 47a of the bent extending section 47 is brought to engage with the rear end 33 of the rearward-extending portion 32 of the aiming screw 14, the right angle bent base portion 48 of the bracket 45 is fixed to a boss 10d formed on the lamp body 10 by a screw 49.

As seen from the above, since the bracket 45 can be retrofitted to the aiming screw 14, assembling of the aiming mechanism to the lamp body 10 can be easily done.

In addition, the rearward-extending portion 32 that has the crown gear 34, the bracket 45, and the expanded-out wall 40 are collectively arranged along an imaginary straight line in a vertical direction, and they do not easily interfere with other components. Accordingly, the lamp can be mounted on a vehicle body easily, and only a small space is required for housing the lamp in the vehicle body.

Figure 7:
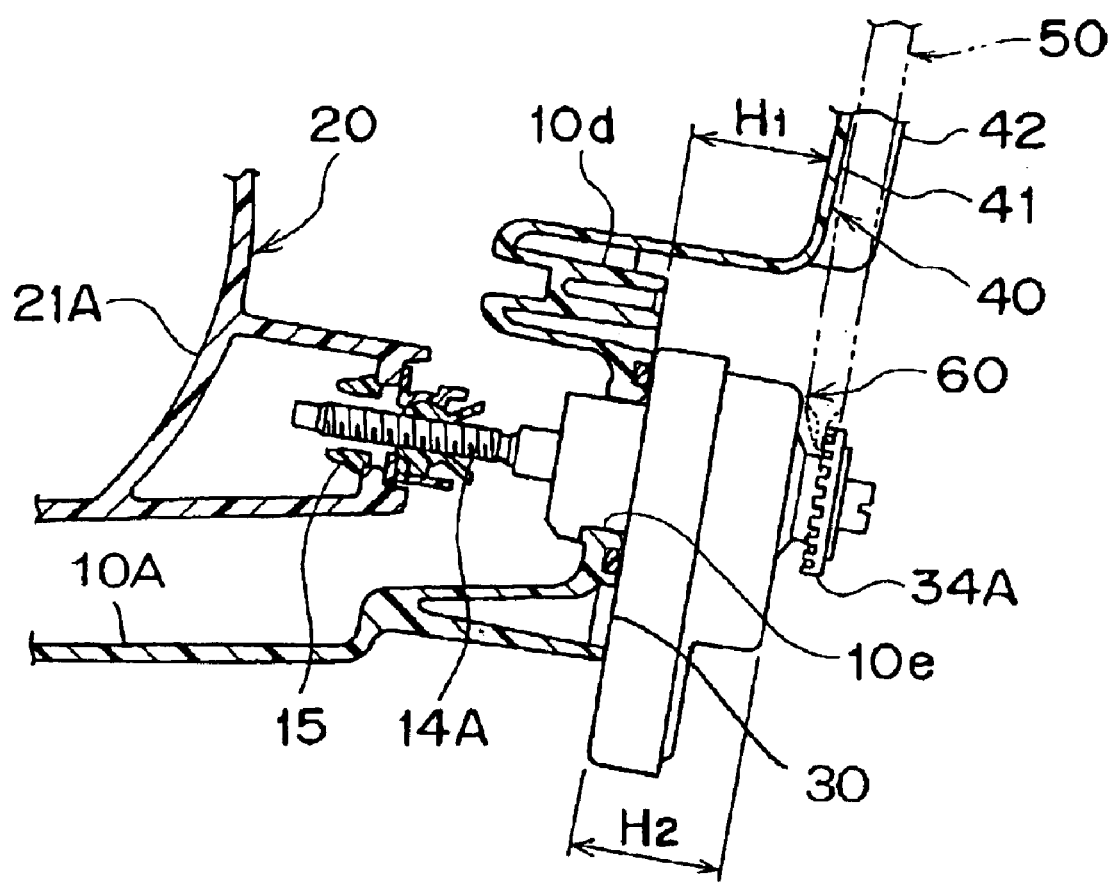
FIG. 7 is a vertical sectional view of the main portion of a reflector-movable headlamp with automatic leveling specifications.
Figure 8:
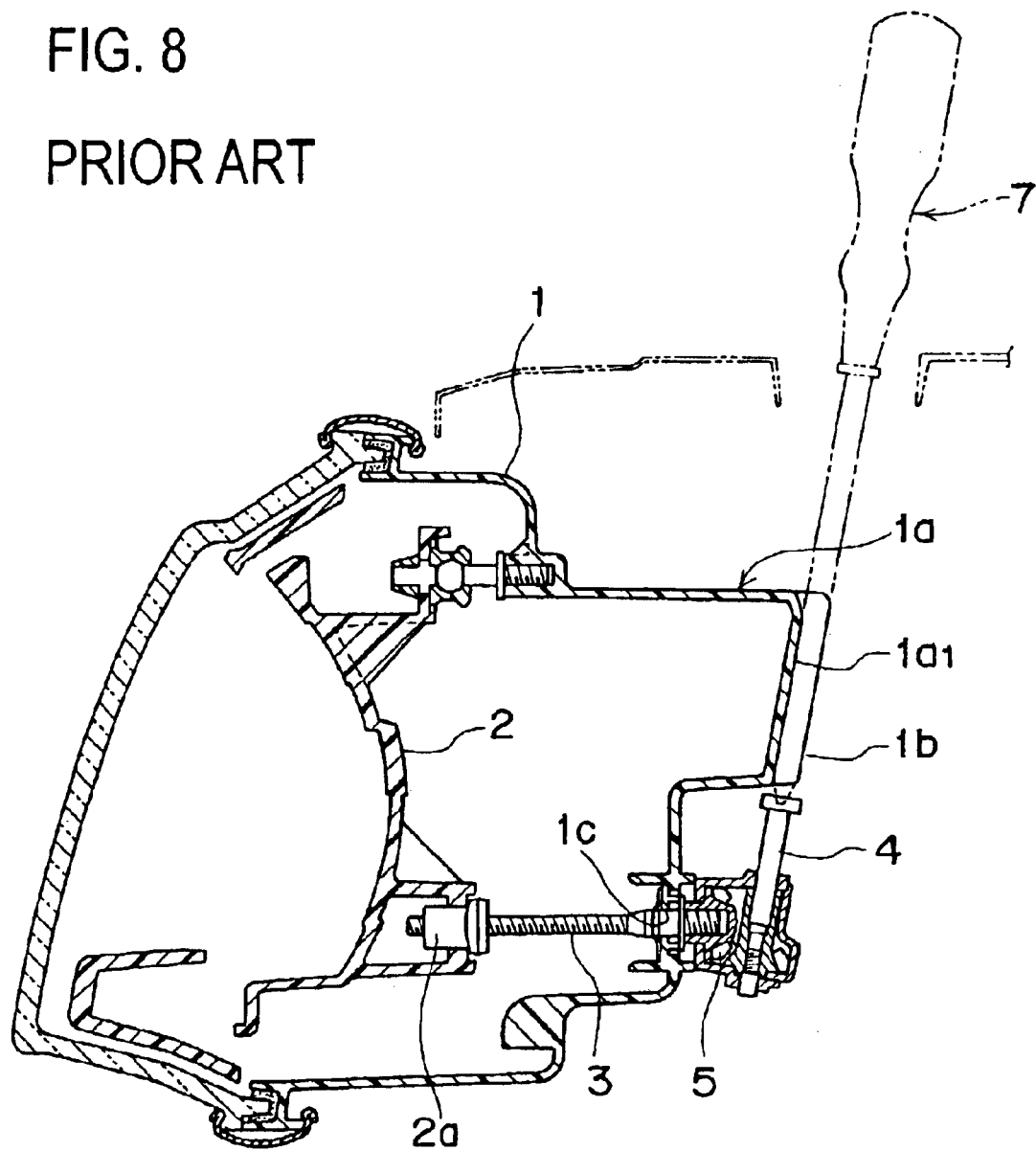
FIG. 8 is a vertical sectional view of a conventional reflector-movable headlamp.
Figure 9:
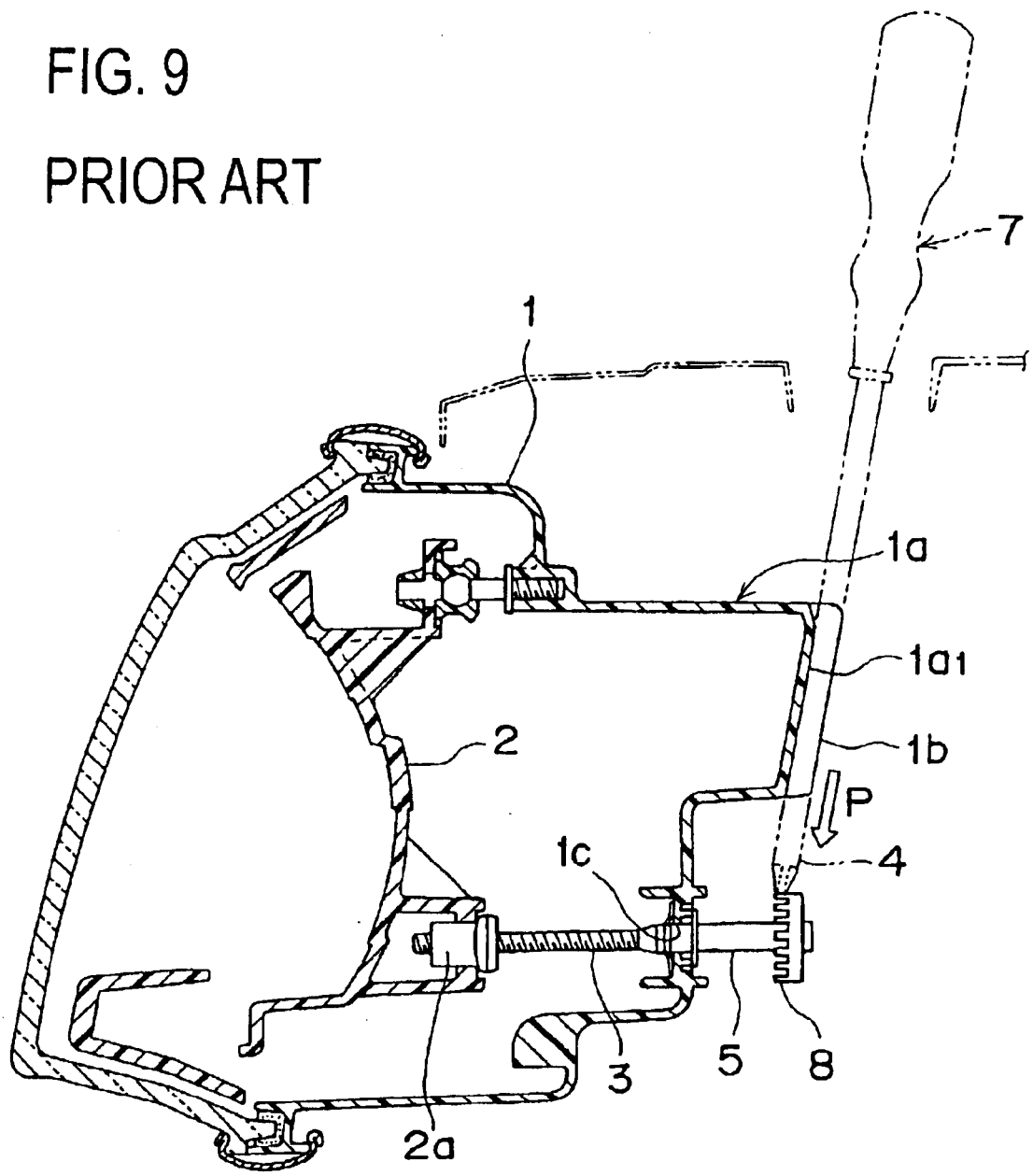
FIG. 9 is a vertical sectional view of a headlamp with an improvement made to the conventional reflector-movable headlamp shown in FIG. 8.

Moreover, as seen from FIG. 7, a rearward protrusion amount H1 of the expanded-out wall 40 with respect to the screw supporting wall 30 can be set so as to be equal to a rearward protrusion amount H2 of an actuator 60 for automatic leveling. This setting is made so that the actuator 60 for automatic leveling can be mounted on the screw supporting wall 30 in place of the bracket 45.

More specifically, FIG. 7 shows the mounting portion of an actuator for automatic leveling used in a headlamp that is designed in accordance with automatic leveling specifications. The headlamp with automatic leveling specifications has, except some aspects, substantially the same structure as that of the headlamp shown in FIGS. 1 to 6 that is not designed in accordance with automatic leveling specifications. In other words, by way of mounting the actuator 60 for automatic leveling on the screw supporting wall 30 in place of the bracket 45, the headlamp becomes a lamp with automatic leveling specifications; and in such a headlamp, the reflector 20 is automatically adjusted tiltably in vertical direction by the inclination of a vehicle on a road surface.

The headlamp in accordance with the automatic leveling specifications as shown in FIG. 7 differs from the headlamp that is not in accordance with the non-automatic leveling specifications, and the different is that in place of the screw insertion hole 10a, an actuator mounting hole 10e that has a larger diameter than the screw insertion hole 10a is formed in the lamp body 10A. The actuator mounting hole 10e can be provided by housing an insert die (not show) for forming the actuator mounting hole 10e in a die for forming the lamp body 10 in accordance with the non-automatic leveling specifications. In other words, a common die can be used not only for the lamp body 10 which is not in accordance with the automatic leveling specifications but also for the lamp body 10A which is in accordance with the automatic leveling specifications.

The lamp with automatic leveling specifications can be obtained by way of installing the actuator 60 for automatic leveling, which integrally has an aiming screw 14A, in the actuator mounting hole 10e instead of employing the bracket 45 which is used for a lamp with non-automatic leveling specifications.

In the structure of FIG. 7, the rearward protrusion amount H1 of the expanded-out wall 40 with respect to the screw supporting wall 30 is equal to the rearward protrusion amount H2 of the actuator 60 for automatic leveling. Accordingly, a crown gear 34A provided on the rear end of the actuator 60 for automatic leveling is disposed at the same position, with respect to the expanded-out wall 40, as the crown gear 34 provided on the aiming screw 14 designed in accordance with non-automatic leveling specifications. Therefore, it is possible to render the teeth of the screwdriver 50, which is set along the screwdriver guide 42 of the expanded-out wall 40, mesh with the teeth of the crown gear 34A, and it is also possible to rotate the screwdriver 50 while rendering the screwdriver 50 link to the crown gear 34A. Thus, as in the case of the headlamp which is not in accordance with automatic leveling specifications, a smooth vertical aiming operation can be performed in the headlamp which is designed in accordance with automatic leveling specifications.

In the above-described embodiment, the bracket 45 is disposed between the rearward-extending portion 32 of the aiming screw 14 and the expanded-out wall 40. The position where the bracket is disposed is not limited to the portion between the screw rearward-extending portion 32 and the expanded-out wall 40, and it can be anywhere in the vicinity of the screw supporting wall 30.

In addition, in the above-described embodiment, the expanded-out wall 40 is provided right above the rearward-extending portion 32 of the aiming screw 14, and the expanded-out wall 40 acts as a guide for the screwdriver for aiming operation and extends from the upper portion to the lower portion of the lamp. However, the position where the expanded-out wall 40 is formed is not limited to above the rearward-extending portion 32 of the aiming screw 14. When the aiming operation by the screwdriver is performed on the side of or below the lamp body, the expanded-out wall 40 can be formed on the side of or below the rearward-extending portion 32 of the aiming screw 14 so as to correspond to the direction in which the screwdriver 50 is used.

As is apparent from the description above, in the movable reflector headlamp according to the present invention, the aiming screw is smoothly rotated without swinging at the time of rotation of the crown gear, and thus a quick aiming operation can be accomplished. Moreover, even if the aiming operation is repeated, the screw support portion of the lamp body does not become loosened, and the beam position does not oscillate; as a result, it is possible to form an appropriate beam position by the aiming operation.

The screwdriver under the rotational operation for rotating the crown gear is maintained so that the tip end of the screwdriver is linked with the crown gear (that is, the teeth of the screwdriver is meshed with the crown gear). Accordingly, a quick aiming operation can be accomplished.

Moreover, since the bracket can be retrofitted to the aiming screw, the aiming mechanism can be assembled easily.

Further, in the structure in which the bracket is disposed between the aiming screw rearward-extending portion and the expanded-out wall, the rearward-extending portion of the aiming screw that protrudes rearward from the rear wall of the lamp body, the bracket and the expanded-out wall are all collectively arranged in a compact manner on a straight line, and they will not interfere with other components. Accordingly, the lamp can be easily installed in a vehicle body, and only a small space is required for the lamp installed in the vehicle body.

Furthermore, in the present invention, in either the lamp in accordance with automatic leveling specifications or the lamp not in accordance with automatic leveling specifications, the aiming operation can be performed easily by way of rotating the aiming screw with a screwdriver.

What is claimed is:

1. A reflector-movable headlamp in which a reflector to which a light source is provided is supported by an aiming mechanism so as to be tiltably moved with respect to a lamp body, wherein
    an aiming screw of said aiming mechanism has a rearward-extending portion that is disposed outside a screw supporting wall of said lamp body,
    a crown gear is provided on said rearward-extending portion of said aiming screw so as to be at a position spaced from a screw supporting wall of said lamp body, said crown gear meshing directly with and operated by a tip end of a screwdriver extending in a direction substantially perpendicular to the aiming screw,
    an expanded-out wall is formed on said lamp body at a position adjacent to said screw supporting wall of said lamp body, said expanded-out wall serving as a screwdriver insertion guide and as a screwdriver side-surface supporting guide,
    said rearward-extending portion of said aiming screw is supported by a bracket provided near said screw supporting wall.

2. A reflector-movable headlamp in which a reflector to which a light source is provided is supported by an aiming mechanism so as to be tiltably moved with respect to a lamp body, wherein
    an aiming screw of said aiming mechanism has a rearward-extending portion that is disposed outside a screw supporting wall of said lamp body.
    a crown gear is provided on said rearward-extending portion of said aiming screw so as to be at a position spaced from a screw supporting wall of said lamp body, said crown gear meshing with a tip end of a screwdriver that is operated in a direction substantially perpendicular to the aiming screw.
    an expanded-out wall is formed on said lamp body at a position adjacent to said screw supporting wall of said lamp body, said expanded-out wall serving as a screwdriver insertion guide and as a screwdriver side-surface supporting guide.
    said rearward-extending portion of said aiming screw is supported by a bracket provided near said screw supporting wall;
    said bracket is substantially L-shaped and is comprised of a sidewise extending section, which extends along a side of said rearward-extending portion of said aiming screw, and a bent extending section, which is bent from a tip end of said sidewise extending section;
    said sidewise extending section is provided with an insertion hole for said screwdriver which is opened in a direction in which a guide portion of said expanded-out wall extends, and which, in cooperation with said guide portion, maintains said screwdriver so that said screwdriver is linked with said crown gear; and
    said bent extending section supports a rear end of said rearward-extending portion of said aiming screw.

3. The reflector-movable headlamp according to claim 2, wherein said screw supporting wall of said lamp body is, in order for an actuator for automatic leveling to be mounted thereon in place of said bracket, structured such that a rearward protrusion amount of said expanded-out wall with respect to said screw supporting wall is equal to a rearward protrusion amount of said actuator for automatic leveling.

4. A reflector-movable headlamp in which a reflector to which a light source is provided is supported by an aiming mechanism so as to be tiltably moved with respect to a lamp body, wherein
    an aiming screw of said aiming mechanism has a rearward-extending portion that is disposed outside a screw supporting wall of said lamp body.
    a crown gear is provided on said rearward-extending portion of said aiming screw so as to be at a position spaced from a screw supporting wall of said lamp body, said crown gear meshing with a tip end of a screwdriver that is operated in a direction substantially perpendicular to the aiming screw
    an expanded-out wall is formed on said lamp body at a position adjacent to said screw supporting wall of said lamp body, said expanded-out wall serving as a screwdriver insertion guide and as a screwdriver side-surface supporting guide,
    said rearward-extending portion of said aiming screw is supported by a bracket provided near said screw supporting wall; and
    said screw supporting wall of said lamp body is, in order for an actuator for automatic leveling to be mounted thereon in place of said bracket, structured such that a rearward protrusion amount of said expanded-out wall with respect to said screw supporting wall is equal to a rearward protrusion amount of said actuator for automatic leveling.

* * * * *